(12) United States Patent
Matsui et al.

(10) Patent No.: US 12,224,462 B2
(45) Date of Patent: Feb. 11, 2025

(54) ELECTROLYTE SUPPLY SYSTEM AND SECONDARY BATTERY USING SAME

(71) Applicants: Panasonic Holdings Corporation, Osaka (JP); PRIMEARTH EV ENERGY CO., LTD., Shizuoka (JP)

(72) Inventors: Hiroki Matsui, Shizuoka (JP); Ryosuke Asai, Osaka (JP); Kouji Iida, Tokyo (JP); Sadaaki Shimura, Shizuoka (JP)

(73) Assignees: PANASONIC HOLDINGS CORPORATION, Osaka (JP); PRIMEARTH EV ENERGY CO., LTD., Shizuoka (JP)

( * ) Notice: Subject to any disclaimer, the term of this patent is extended or adjusted under 35 U.S.C. 154(b) by 0 days.

(21) Appl. No.: 18/730,036

(22) PCT Filed: Dec. 26, 2022

(86) PCT No.: PCT/JP2022/047858
§ 371 (c)(1),
(2) Date: Jul. 18, 2024

(87) PCT Pub. No.: WO2023/188644
PCT Pub. Date: Oct. 5, 2023

(65) Prior Publication Data
US 2024/0421458 A1    Dec. 19, 2024

(30) Foreign Application Priority Data

Mar. 31, 2022  (JP) .................................. 2022-058735

(51) Int. Cl.
*H01M 50/673* (2021.01)
*H01M 50/609* (2021.01)
*H01M 50/77* (2021.01)

(52) U.S. Cl.
CPC ....... *H01M 50/673* (2021.01); *H01M 50/609* (2021.01); *H01M 50/77* (2021.01)

(58) Field of Classification Search
None
See application file for complete search history.

(56) References Cited

FOREIGN PATENT DOCUMENTS

| CN | 210516859 U | 5/2020 |
|----|-------------|--------|
| CN | 112582763 A | 3/2021 |
| JP | H8-236144   | 9/1996 |

OTHER PUBLICATIONS

ISR for PCT/JP2022/047858, dated Mar. 14, 2023 (w/ translation).

*Primary Examiner* — Amanda J Barrow
(74) *Attorney, Agent, or Firm* — Greenblum & Bernstein, P.L.C.

(57) ABSTRACT

An electrolyte supply system for supplying an electrolyte to a use point, includes: a receiving storage tank configured to store the electrolyte that has been delivered; a supply storage tank to which the electrolyte is transferred from the receiving storage tank; a temperature control device configured to control temperatures of the electrolyte in the receiving storage tank and that in the supply storage tank; and a supply pipe that is laid from the supply storage tank to the use point. The electrolyte supply system is highly safe because the storage tanks are disposed in an outdoor location, and furthermore, performs a temperature control process for the receiving storage tank before the electrolyte is transferred to the supply storage tank. Thus, it can supply the electrolyte to the use point 24 hours a day even with little temperature control in the supply storage tank.

5 Claims, 9 Drawing Sheets

$$V_1^{\Sigma(n)} = (1-a)V_1^n + aV_1^{R(n-1)} \quad \cdots (1)$$

Use Points $$L(n) = (1-a)V_1^{\Sigma(n)} + cV_2^{S(n-1)} \quad \cdots (2)$$

$$UL(n) = (1-c)L(n) = (1-c)\{(1-a)V_1^{\Sigma(n)} + cV_2^{S(n-1)}\} \quad \cdots (3)$$

$$cV_2^{S(n)} = c\{(1-a)V_1^{\Sigma(n)} + cV_2^{S(n-1)}\} \quad \cdots (4)$$

ELECTROLYTE SUPPLY SYSTEM AND SECONDARY BATTERY USING SAME

TECHNICAL FIELD

The present invention relates to a system for supplying an electrolyte to a device (use point) that injects an electrolyte into batteries in a battery manufacturing plant, and more particularly, to an electrolyte supply system in a case where a supply tank is provided in an outdoor location.

BACKGROUND ART

Rechargeable batteries are formed by inserting a cathode and an anode into a case and injecting an electrolyte into the case. Lead-acid batteries utilize dilute sulfuric acid as an electrolyte. Furthermore, suitable injection devices have also been developed (PTL 1). In lithium ion-based batteries which are currently becoming mainstream, a large number of compositions mainly containing a lithium salt and the like have been proposed as an electrolyte. These electrolytes have low temperature stability before the time of injection, are unlikely to ensure a specific temperature at the time of injection, and thus often have characteristics of being susceptible to temperature changes.

In the trend toward global carbon neutrality, the demand for lithium ion-based batteries like those described above has been increasing. Therefore, large-scale manufacturing facilities for these batteries are being planned.

CITATION LIST

Patent Literature 8-236144
PTL 1: Japanese Patent Application Laid-Open No. Hei.

SUMMARY OF INVENTION

Technical Problem

The electrolyte having low resistance to temperature change is currently stored in a chemical tank of several hundred liters provided indoors with little temperature change, and this electrolyte is supplied to a device (a use point) where the electrolyte is injected into batteries. However, when the scale of battery manufacture is increased in the future, it is necessary to store the electrolyte in a tank as large as several tens of cubic meters.

The electrolyte is delivered into a manufacturing plant by means such as a lorry. However, there is a possibility that the temperature of the electrolyte deviates from a temperature suitable for use during the movement from the manufacturing site of the electrolyte to the manufacturing plant of the battery and also during transfer of the electrolyte from the lorry to the receiving tank.

Therefore, it is necessary to control the temperature of the electrolyte to an optimum usage temperature between the delivery and the use point. In addition, in mass production sites, an electrolyte is always required at some use points, and the electrolyte having a constant temperature must be supplied at any time, 24 hours a day.

In addition, lithium ion-based batteries have high energy density, and occurrence of ignition accidents has also been reported. Consequently, it is necessary to perform lot management of materials that have been used. Lot management is necessary because it is necessary to have a list of the corresponding relationship between the manufactured products and the lots of materials that have been used.

In order to satisfy these requirements, one conceives of a system that is provided with a plurality of large-scale storage tanks capable of controlling the temperature of a delivered electrolyte and supplying the electrolyte to a certain use point and that sequentially switches these storage tanks.

However, when a plurality of storage tanks are provided and sequentially switched, the electrolyte remaining in the pipe that extends from a certain storage tank to a switching point is not subjected to temperature control until the next instance of supplying the electrolyte from the storage tank, and the electrolyte remains left standing in the pipe. In this state, when the electrolyte is supplied from the storage tank next, the electrolyte that was left standing reaches the use point first. This circumstance signifies that an electrolyte that is not guaranteed in quality has been supplied.

Furthermore, in the case of an electrolyte, in order to always perform temperature control, it is desirable to provide a return pipe that extends from the use point and to return the electrolyte that has not been used to the storage tank that serves as the supply source. However, when the storage tank is switched to another, the electrolyte remaining in the return pipe passes through the use point from the switching point and returns to the other storage tank after the switching. In the lot management of a liquid, if the liquid is not made to be consumed in the order of delivery, the management becomes complicated. Consequently, if a defective product has been produced, it would be difficult to perform lot management in terms of which lot of electrolyte affects the products and which product is affected thereby.

That is, when an electrolyte supply system is constructed by arranging large-scale storage tanks in parallel, there arises a quality problem that the electrolyte on which temperature control has not been performed is supplied to use points, or that lot management of the electrolyte is not easy.

Solution to Problem

The present invention has been conceived in view of the above-mentioned problems, and is intended to always supply, to a use point, an electrolyte whose temperature has been controlled to be use temperatures.

More specifically, the electrolyte supply system according to the present invention is
an electrolyte supply system for supplying an electrolyte to a use point, including:
a receiving storage tank configured to store the electrolyte that has been delivered;
a supply storage tank to which the electrolyte is transferred from the receiving storage tank;
a temperature control device configured to control temperatures of the electrolyte in the receiving storage tank and that in the supply storage tank; and
a supply pipe that is laid from the supply storage tank to the use point.

The present invention also provides a secondary battery manufactured by supplying an electrolyte using the above-described electrolyte supply system.

Advantageous Effects of Invention

In the electrolyte supply system according to the present invention, two tanks are connected in series, which are the supply storage tank for supplying an electrolyte to a use point and the receiving storage tank for transferring the electrolyte to the supply storage tank. Thus, the temperature of the electrolyte received in the receiving storage tank is controlled to be a use temperature, and then the electrolyte is transferred to the supply storage tank. As a result, an electrolyte that is always controlled to be at the use temperature is prepared in the supply storage tank. In addition, since the receiving storage tank and the supply storage tank are connected in series, lot management is also facilitated.

DESCRIPTION OF EMBODIMENTS

Hereinafter, an electrolyte supply system according to the present invention will be described with reference to the figures and embodiments.

Note that the following description exemplifies one embodiment of the present invention, and the present invention is not limited to the following description. The following description can be modified without departing from the gist of the present invention. In addition, in the present specification, control of the temperature of an electrolyte is referred to as "temperature control".

<Subject to be Handled>

The electrolyte supply system of the present invention can properly meet the requirements of the use points and can be suitably used to store large quantities of electrolyte in liquid form that is reluctant to contact with air, has a relatively narrow storage temperature range of ±5° C. and is flammable, and to supply it to the use points.

<Configuration>

Figure 1:
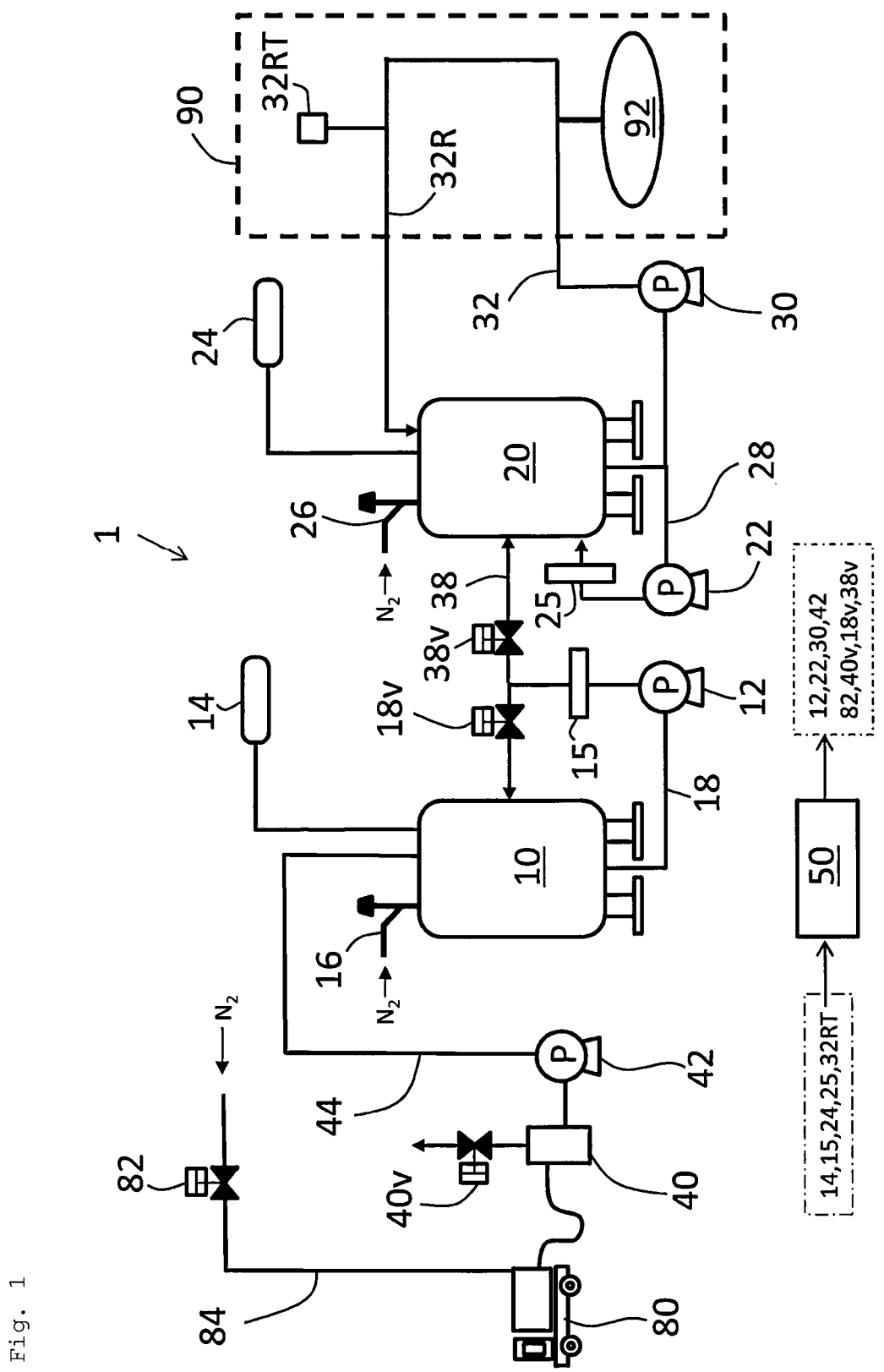
FIG. 1 is a diagram illustrating a configuration of an electrolyte supply system according to the present invention.

FIG. 1 illustrates a configuration of an electrolyte supply system 1 according to the present invention. The electrolyte supply system 1 is configured to include a receiving storage tank 10 connected to a gas-liquid separation device 40 through a receiving pipe 44, a supply storage tank 20 connected to the receiving storage tank 10 through a connection pipe 38, and a supply pipe 32 connected to the supply storage tank 20. The supply pipe 32 extends to a use point 92 in an indoor space 90.

Herein, the receiving storage tank 10 is a tank having a function of receiving an electrolyte from an external source, such as a lorry or the like. Furthermore, the supply storage tank 20 has a function of receiving the electrolyte from the receiving storage tank 10 and also has the supply pipe 32 to connect to the use point 92. Therefore, it can be said that the receiving storage tank 10 cannot directly supply the electrolyte to the use point 92, and the supply storage tank 20 does not have a function of directly receiving the electrolyte from an external source, such as a lorry or the like.

The use point 92 may be a point where the electrolyte is drawn from the supply pipe 32 through a branch pipe and used, and there may be a plurality of use points 92 in the indoor space 90. Furthermore, the supply pipe 32 may be configured to return from the use point 92 to the supply storage tank 20. The pipe extending from the use point 92 that is on the most downstream, as viewed from the supply storage tank 20, is referred to as a return pipe 32R. A thermometer 32RT is disposed at the return pipe 32R.

The receiving storage tank 10 and the supply storage tank 20 are installed outdoors and each have an internal volume of 5 m³ or more. A heat insulating material or the like is disposed outside or inside the wall surface of each of the tanks. As a result, heat insulation is achieved. In addition, the tanks have a liquid-tight and air-tight structure.

The receiving storage tank 10 includes a breather valve 16, a pressure monitoring unit 14, and a liquid level sensor (not illustrated). The breather valve 16 supplies nitrogen gas from a nitrogen supply source (not illustrated) to prevent pressure decrease in the receiving storage tank 10. That is, the inside of the receiving storage tank 10 is filled with nitrogen. Therefore, the electrolyte in the receiving storage tank 10 is not exposed to air (oxygen).

Although the pressure in the receiving storage tank 10 changes when the electrolyte is injected into the receiving storage tank 10, transferred from the receiving storage tank 10 to the supply storage tank 20, or the like, the pressure can be maintained at a slightly positive pressure above atmospheric pressure by the nitrogen supply source and the breather valve 16. This slightly positive pressure serves to prevent the inflow of air from the outside. When an unexpected increase or decrease in internal pressure occurs, the pressure monitoring unit 14 opens a release valve (not illustrated) to discharge the gas in the receiving storage tank 10 or to introduce external air into the receiving storage tank 10.

As described above, for the receiving storage tank 10, detection of the liquid level (the level may be the height from the bottom surface of the receiving storage tank 10) of the electrolyte contained therein and adjustment of the pressure within the space apart from the electrolyte can be achieved.

A circulation pipe 18 is disposed at the receiving storage tank 10. The circulation pipe 18 is provided with a receiving storage tank pump 12, a circulation pipe valve 18v, and a temperature control device 15.

The temperature control device 15 sets the temperature of the electrolyte in the receiving storage tank 10 to a predetermined temperature. The configuration thereof is not particularly limited, but includes at least a heating/cooling unit and a temperature sensor. The temperature sensor may be one configured to measure the temperature of the electrolyte in the receiving storage tank 10.

The temperature setting of the temperature control device 15 is to be set in advance to a predetermined temperature, and the temperature control device 15 adjusts the temperature of the electrolyte that passes through the circulation pipe 18. The predetermined temperature that is to be set may be changed by a controller 50.

A connection pipe 38 connected to the supply storage tank 20 is provided between the temperature control device 15 and the circulation pipe valve 18v. The connection pipe 38 is provided with a connection pipe valve 38v.

A similar configuration to the above-described configuration is also arranged in the supply storage tank 20, and is composed of a pressure monitoring unit 24, a temperature control device 25, a breather valve 26, and a circulation pipe 28. The supply storage tank 20 is provided with the circulation pipe 28. The circulation pipe 28 is provided with a supply storage tank pump 22 and the temperature control device 25.

As described above, the supply pipe 32 is connected to the supply storage tank 20. A supply pump 30 is provided in the supply pipe 32 to supply the electrolyte into the supply pipe 32.

The electrolyte supply system 1 may be provided with the controller 50 that controls the entire system. The controller 50 is connected to the respective pumps, the respective valves and the temperature control devices 15 and 25, the liquid level sensors (not illustrated), the pressure monitoring units 14 and 24, and the thermometer 32RT. The controller 50 is capable of exchanging signals with these components. Note that the controller 50 may include more than one controller to be provided for each controlled object.

Specifically, the signals include those signaling activation and stoppage of each pump, opening and closing of each valve, temperature settings of the temperature control devices 15 and 25, acquisition of the temperature of the electrolyte, acquisition of the current liquid level in the storage tanks, and the like. In addition, the controller 50 can also perform lot management of the electrolytes to be delivered.

<Operation>

Figure 2:
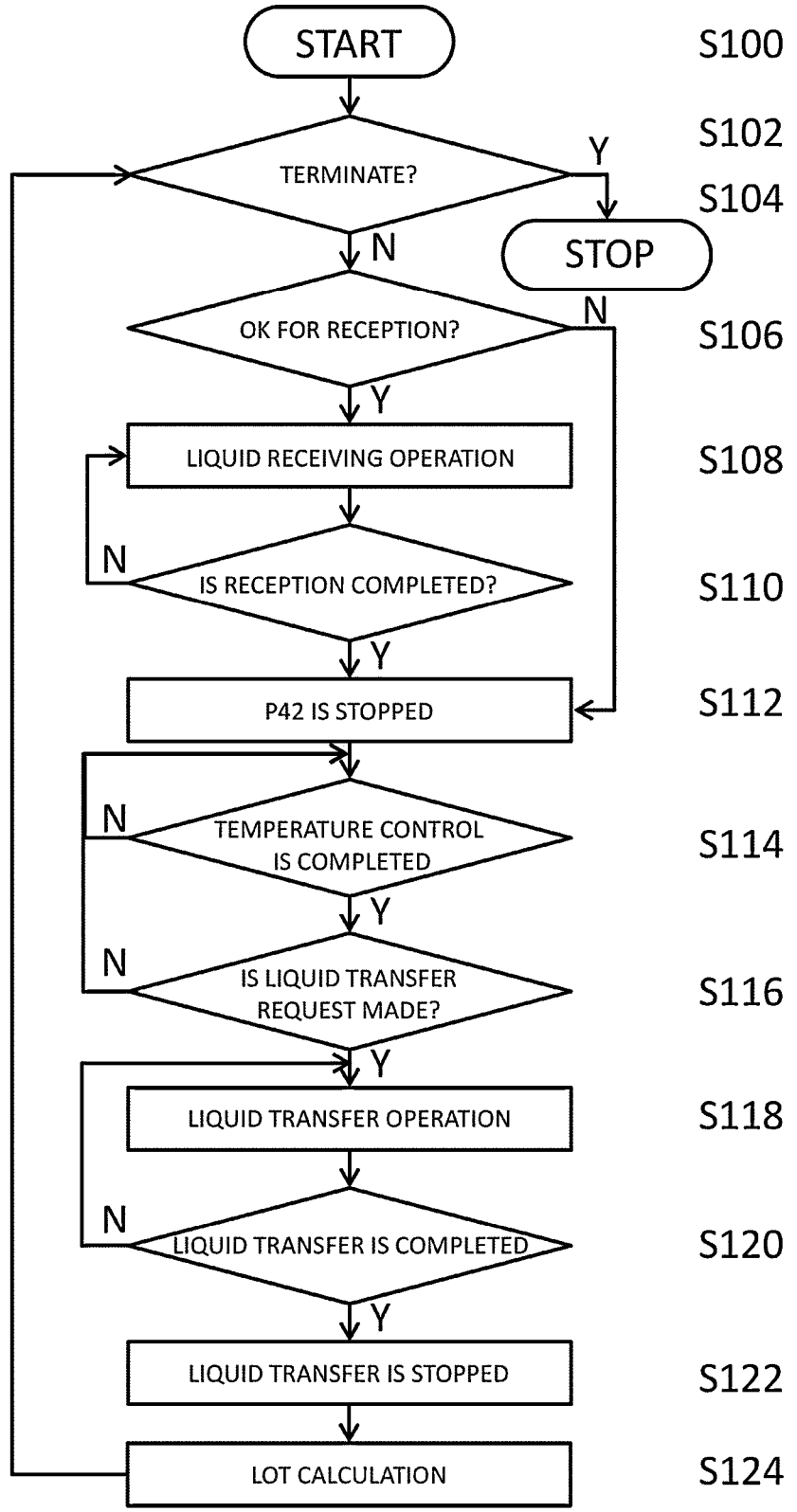
FIG. 2 is a flow chart showing the control of a receiving storage tank by a controller.
Figure 3:
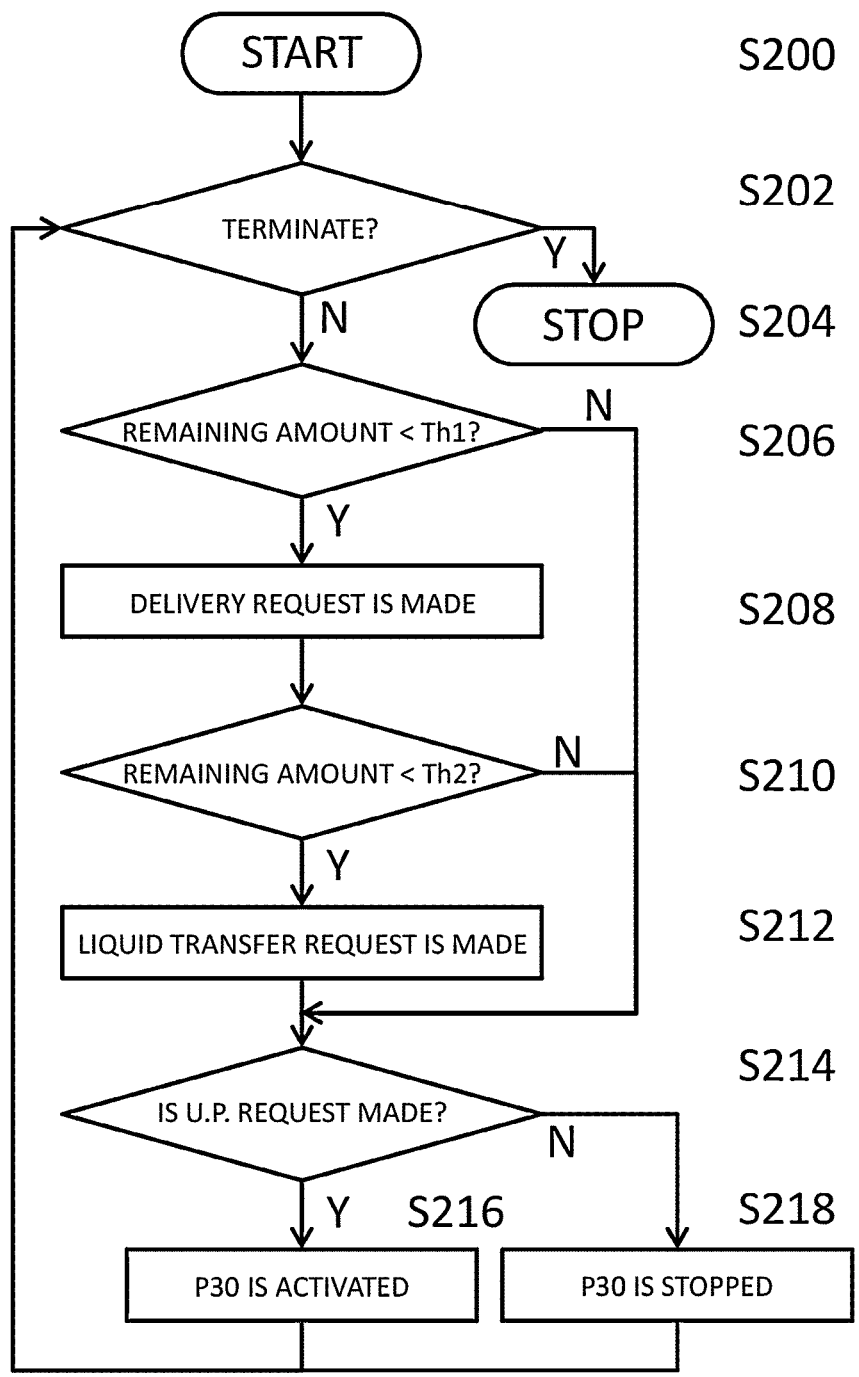
FIG. 3 is a flow chart showing the control of a supply storage tank by the controller.

Next, the operation of the electrolyte supply system 1 will be described. FIG. 2 shows a process flow for controlling the receiving storage tank 10, and FIG. 3 shows a flow for controlling the supply storage tank 20. The flows shown in FIGS. 2 and 3 are preferably executed simultaneously in the controller 50.

As a general operation of the electrolyte supply system 1, the electrolyte delivered by the lorry 80 or the like is received into the receiving storage tank 10 through the gas-liquid separation device 40 at a predetermined timing, the temperature is adjusted to a predetermined temperature, and then the electrolyte is transferred to the supply storage tank 20 so as to be supplied to the use point 92.

Referring to FIG. 2, when the control of the receiving storage tank 10 is started (step S100), a decision whether to terminate is made (step S102). When the process is terminated (Y branch in step S102), the control is ended (step S104). When the process is not terminated (N branch in step S102), the process proceeds to the subsequent process (step S106). Here, the decision whether to terminate may involve a manual stop or a stop due to some emergency. In addition, termination may be performed in the instance when the receiving storage tank 10 is empty and the electrolyte from the lorry 80 is being waited for.

Figure 4:
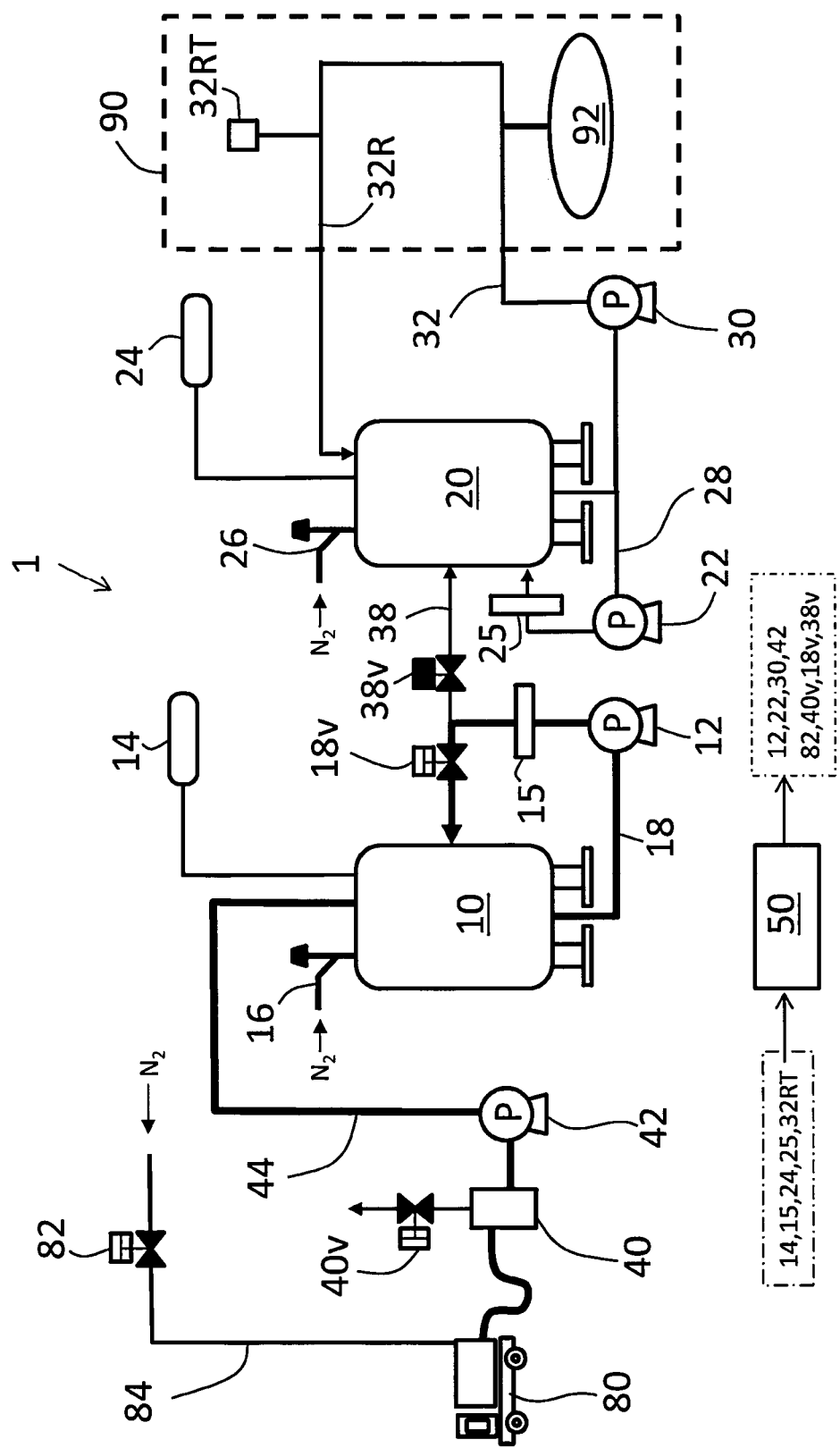
FIG. 4 is a diagram illustrating a state in which an electrolyte is transferred from a lorry to the receiving storage tank.

In step S106, it is determined whether the electrolyte can be received in the receiving storage tank 10. Here, it is determined whether a free space in the receiving storage tank 10, the arrival of the lorry 80 on which the electrolyte is mounted, and the preparation for feeding the liquid to the receiving storage tank 10, etc. are satisfactory. If it is determined that the receiving storage tank 10 can receive the electrolyte (Y branch in step S106), the liquid receiving operation is performed (step S108). Specifically, the circulation pipe valve 18v is opened, the connection pipe valve 38v is closed, and a receiving pump 42 and a receiving storage tank pump 12 are activated. In FIG. 4, the flow of the electrolyte at this time is indicated by a thick line.

Referring to FIG. 4, the electrolyte from the lorry 80 passes through the gas-liquid separation device 40, so that bubbles generated in the electrolyte are removed. Then, the electrolyte passes through the receiving pipe 44 by the receiving pump 42 and is transferred to the receiving storage tank 10. At this time, two valves are opened, which are a valve 40v for discharging gases from the gas-liquid separation device 40 and a valve 82 for filling the lorry 80 with nitrogen in a volume corresponding to a reduced volume of the electrolyte.

In addition, the connecting pipe valve 38v is closed (indicated by the notation above the valve being filled with black, and the same shall apply hereinafter), and the circulation pipe valve 18v is opened (indicated by the notation above the valve being shown in white while being indicated with a mark T, and the same shall apply hereinafter). Since the receiving storage tank pump 12 is activated, the temperature of the electrolyte in the receiving storage tank 10 is controlled to a predetermined temperature by the temperature control device 15 while the electrolyte circulates.

Referring back to FIG. 2 again, whether or not receiving is complete is determined by whether or not the receiving storage tank 10 is filled (step S110). This determination can be made by a liquid level sensor or the like in the receiving storage tank 10 (not illustrated in FIG. 1). If the receiving is not completed (N branch in step S110), the process returns to step S108 to continue to receive the electrolyte. If the reception is completed (Y branch in step S110), the process proceeds to the next step.

In the subsequent process (step S112), the receiving pump 42 is stopped. The valve 40v and the valve 82 may also be closed. In step S106, if the receiving storage tank 10 is not ready to receive the electrolyte (N branch in step S106), the process jumps to this step S112.

Next, it is determined whether or not the temperature control of the electrolyte in the receiving storage tank 10 is completed (step S114). This state may be confirmed on the basis of temperatures measured by a thermometer disposed in the receiving storage tank 10. Alternatively, if a state in which the difference between the temperature of the electrolyte flowing into the temperature control device 15 and the temperature of the electrolyte flowing out therefrom is sufficiently small continues for a predetermined time or longer, it may be determined that the temperature of the electrolyte in the receiving storage tank 10 is maintained at the set temperature.

If the temperature is not controlled (N branch in step S114), the temperature control is repeated. If the temperature has been controlled (Y branch in step S114), it is determined whether or not a liquid transfer request is made from the supply storage tank 20 (step S116). The liquid transfer request can be determined by the controller 50 on the basis of the remaining amount of the electrolyte in the supply storage tank 20.

If the liquid transfer request is not made (N branch in step S116), the temperature control process (step S114) is repeated. If the liquid transfer request has been made (Y branch in step S116), a liquid transfer operation is performed (step S118). Specifically, the circulation pipe valve 18v is closed, and the connection pipe valve 38v is opened.

Figure 5:
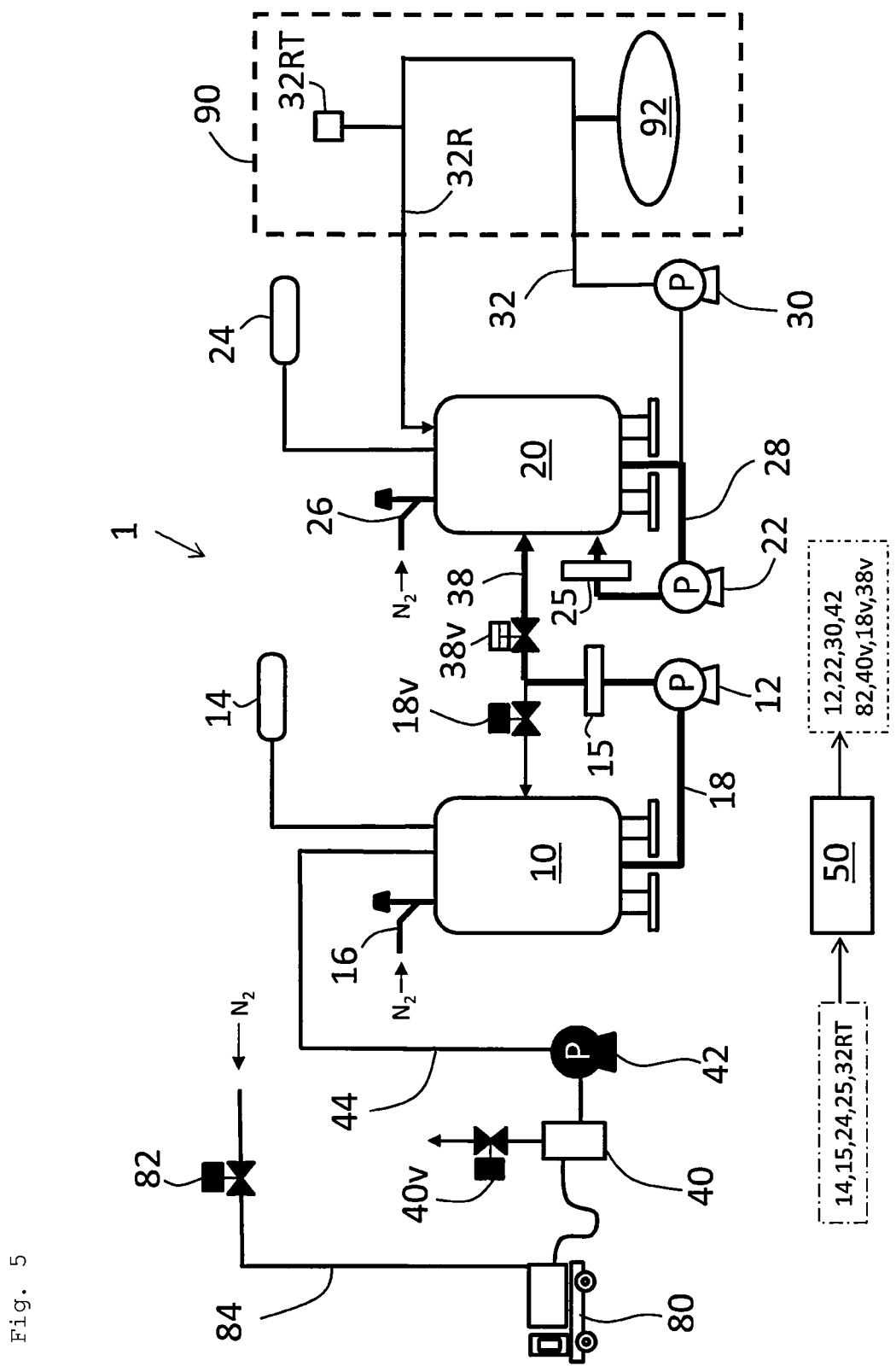
FIG. 5 is a diagram illustrating a state in which the liquid is transferred from the receiving storage tank to the supply storage tank.

In FIG. 5, the flow of the electrolyte in step S118 is indicated by a thick line. The supply storage tank pump 22 is controlled to be constantly in an activated state on the supply storage tank 20 side. Note that the pump 22 may be activated periodically or depending on the temperature of the electrolyte in the supply storage tank 20. The electrolyte flows from the inside of the receiving storage tank 10, through the circulation pipe 18, the temperature control device 15, and the connection pipe 38, to the supply storage tank 20. Furthermore, the temperature of the electrolyte is controlled also in the supply storage tank 20 by the circulation pipe 28, the supply storage tank pump 22, and the temperature control device 25.

Here, referring also to FIG. 4, the receiving storage tank pump 12 is used for circulation of the electrolyte in the receiving storage tank 10 and is also used for transferring the electrolyte to the supply storage tank 20. With such a configuration, if the receiving storage tank pump 12 is activated, the electrolyte does not stay in the pipe that extends from the receiving storage tank 10 toward the supply storage tank 20.

If the circulation pump and the liquid transfer pump are separate components, when the electrolyte is transferred from the receiving storage tank 10 to the supply storage tank 20 using the liquid transfer pump, the electrolyte would result in being suspended in the pipe extending from the receiving storage tank 10 to the supply storage tank 20 without flowing until the next transfer of the electrolyte. The temperature of the residual electrolyte may deviate from an appropriate temperature range due to a lapse of time.

Then, the electrolyte whose temperature is not controlled would be transferred to the supply storage tank 20. Just before the electrolyte is transferred to the supply storage tank 20, the amount of the electrolyte in the supply storage tank 20 is reduced. Thus, there is a possibility that the temperature of the electrolyte in the supply storage tank 20 would change due to the temperature-uncontrolled electrolyte in the pipe extending from the receiving storage tank 10 toward the supply storage tank 20.

When viewed from the use point 92 side, this circumstance signifies that an electrolyte whose temperature has changed is supplied. On the other hand, a configuration that can also be used for transferring the electrolyte to the supply storage tank 20 can be made by arranging the receiving storage tank pump 12 to be in the middle of the circulation pipe 18 as shown in FIG. 4 and FIG. 5 and by operating the circulation pipe valve 18*v*. With this configuration, it is possible to reduce such a residual electrolyte like that described above.

Referring back to FIG. 2 again, the liquid transfer operation is performed (step S118). As a result, the electrolyte is transferred from the receiving storage tank 10 to the supply storage tank 20, and it is determined whether the liquid transfer is completed (step S120). This determination may be made on the basis of any of factors including the liquid level in the receiving storage tank 10, the liquid level in the supply storage tank 20, and the liquid transfer amount.

If the liquid transfer is not completed (N branch in step S120), the liquid transfer operation is continued (step S118). If the liquid transfer is completed (Y branch in step S120), the subsequent liquid transfer stopping operation is performed (step S122). Specifically, the receiving storage tank pump 12 is stopped and the connection pipe valve 38*v* is closed. The supply storage tank pump 22 may continue to be activated because the temperature control of the electrolyte in the supply storage tank 20 is continued. Then, the process returns to the decision whether to terminate (step S102).

Before returning to step S102, calculation for the lot management may be performed (step S124). This calculation will be described later. In the figure, this calculation is indicated by "LOT CALCULATION". In the lot calculation, the lot number and the ratio of the electrolyte constituting the electrolyte in the supply storage tank 20 are calculated and recorded, so that the lots are managed. Here, the lot number is associated with at least the reception date and time of the electrolyte received in the receiving storage tank 10. The lot number may also be associated with a quantity of the receiving electrolyte.

Figure 6:
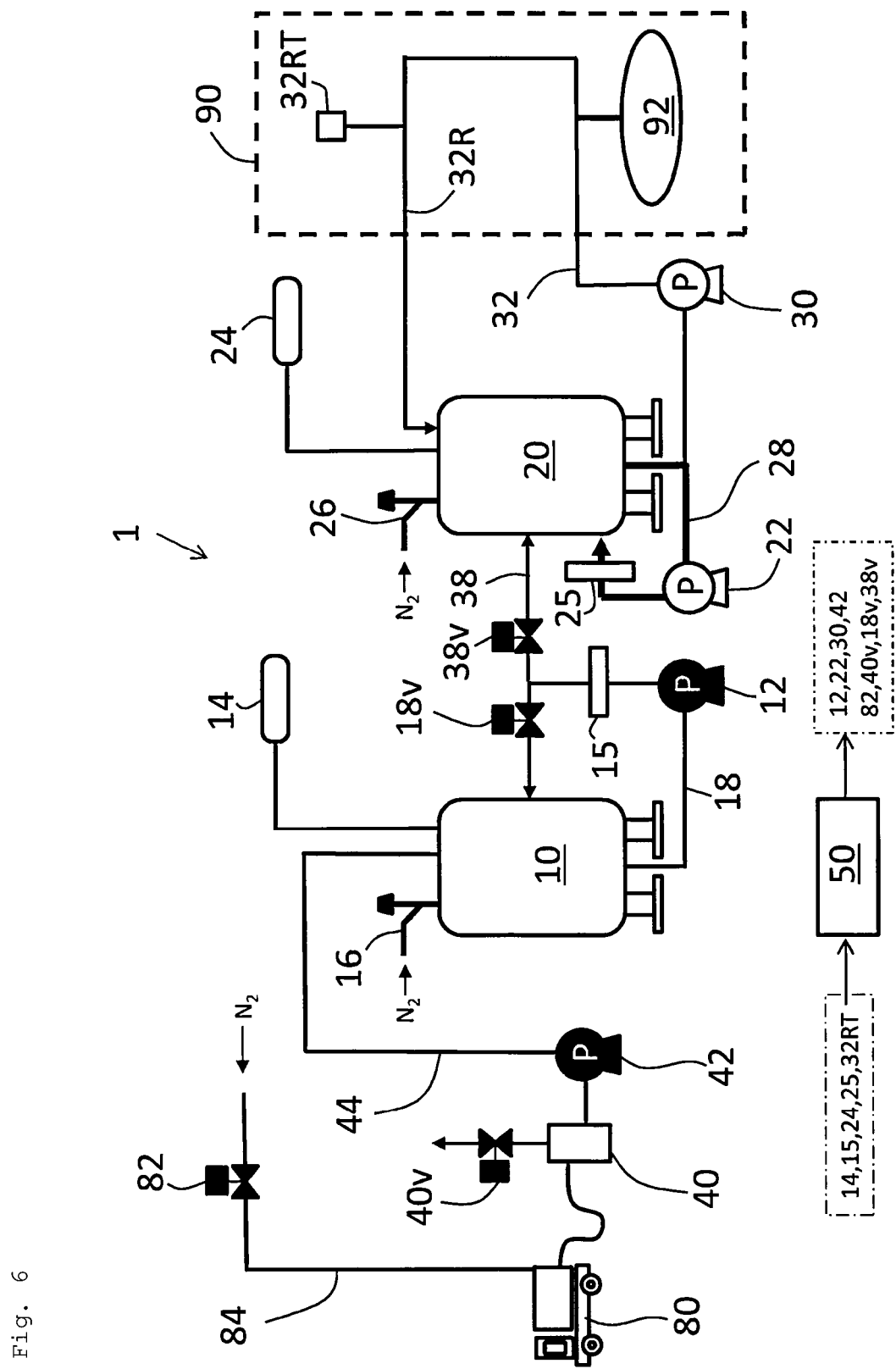
FIG. 6 is a diagram illustrating the flow of the electrolyte at the time of temperature control in the supply storage tank.

FIG. 6 shows the state in step S122. Since the supply storage tank pump 22 is activated and the connection pipe valve 38*v* is closed, the temperature of the electrolyte in the supply storage tank 20 is controlled to be a predetermined temperature by the temperature control device 25 while the electrolyte is made to flow through the circulation pipe 28.

Next, with reference to FIG. 3, control of the supply storage tank 20 will be described. When the process starts (step S200), a decision whether to terminate is performed (step S202). When the process is terminated (Y branch in step S202), the process is stopped (step S204). When the process is not terminated (N branch in step S202), the process proceeds to the subsequent process.

Next, the remaining amount of the electrolyte in the supply storage tank 20 is checked (step S206 and step S210). First, when the remaining amount is less than a predetermined threshold value Th1 (Y branch in step S206), the lorry 80 makes a delivery request of the electrolyte (step S208). Since the electrolyte supply system 1 handles a large volume of the electrolyte, the pace of consumption, the time lag from the delivery request till the actual delivery, and the amount of time for the temperature control in the receiving storage tank 10 are taken into consideration in advance and the delivery request is then made. Note that the delivery request may be directly made by the controller 50, and may be indirectly made by, for example, displaying a timing of the delivery request to an operator.

When the remaining amount is less than a predetermined threshold value Th2 (Y branch in step S210), a liquid transfer request is made (step S212). When the liquid transfer request is made, the electrolyte is transferred from the receiving storage tank 10 to the supply storage tank 20 (step S118 in FIG. 2). Note that the threshold value Th1 is larger than the threshold value Th2, and when the remaining amount checking steps (step S206 and step S210) are both N branches, the process skips to the subsequent step of step S212.

Next, the presence or absence of a request from the use point (denoted as "U.P." in FIG. 3) 92 is determined (step S214). At the use point 92, when the electrolyte is consumed, a use request is made to the electrolyte supply system 1. If there is a request from the use point 92 (Y branch in step S214), the supply pump 30 (denoted as "P30" in FIG. 3) is activated (step S216). If there is no request (N branch in step S214), the supply pump 30 is not activated (stopped: step S218).

Figure 7:
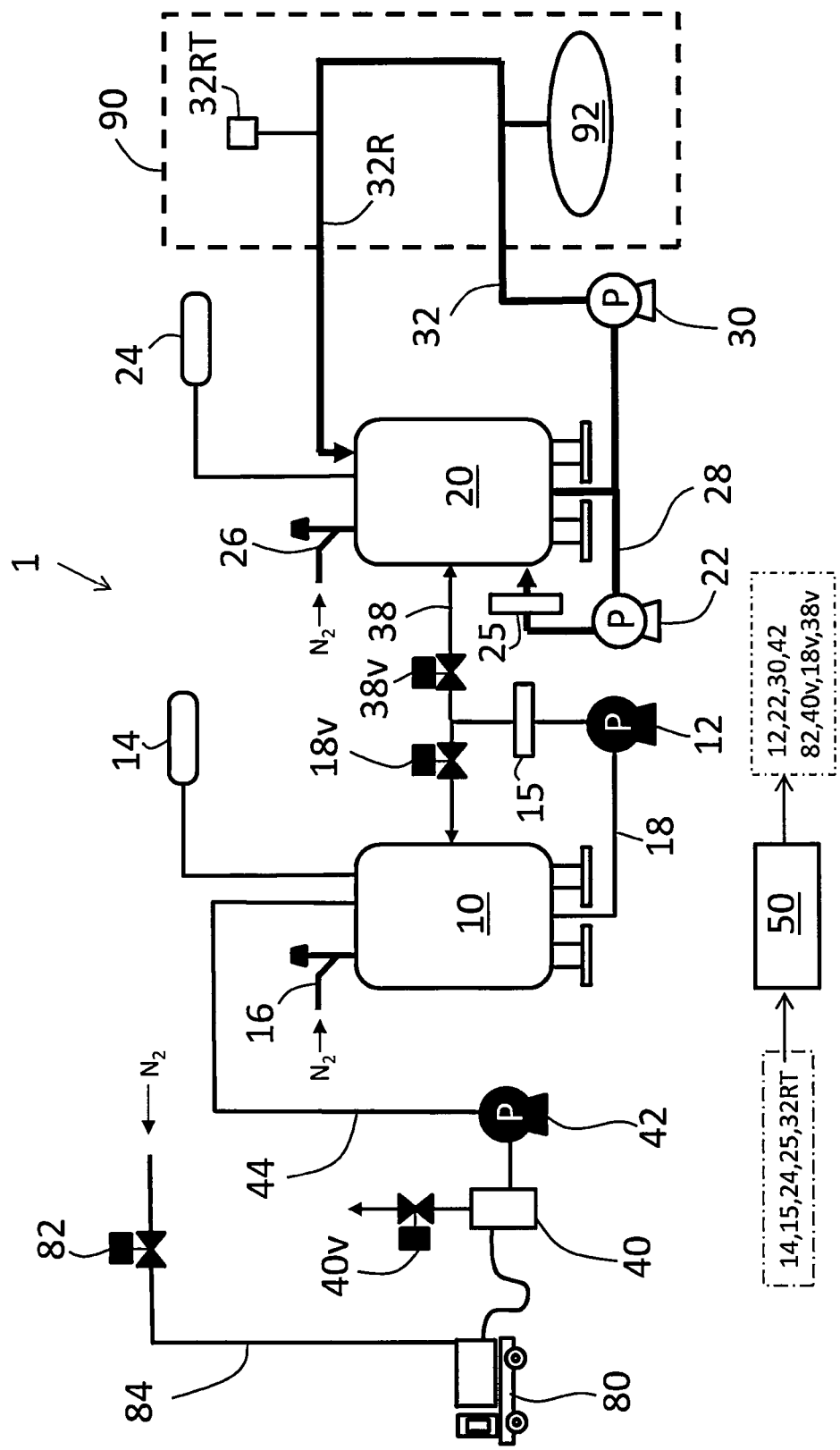
FIG. 7 is a diagram illustrating a state in which the electrolyte is supplied from the supply storage tank to a use point.

FIG. 7 shows a state in which the electrolyte is supplied from the supply storage tank 20 to the use point 92 and returns to the supply storage tank 20 through the return pipe 32R. At this time, the electrolyte is also circulated in the circulation pipe 28, so that the temperature of the electrolyte in the supply storage tank 20 is maintained at a constant temperature by the temperature control device 25.

Returning back to FIG. 3 again, if the operation of the supply pump 30 (step S216 or step S218) is stopped, the process returns to the decision whether to terminate (step S202).

Figure 8:
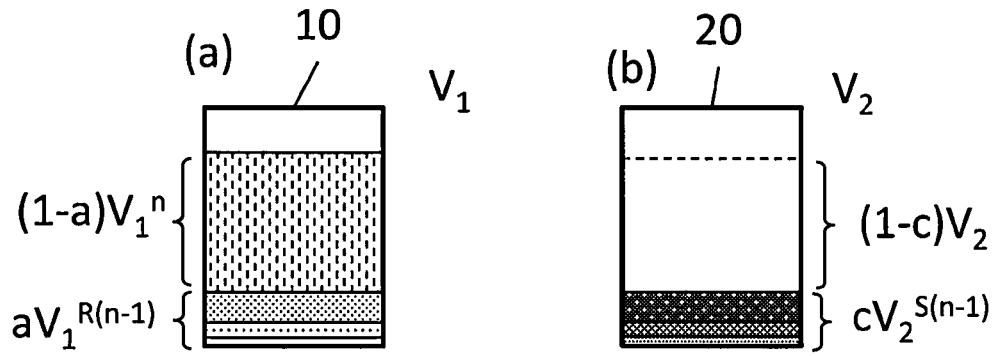
FIG. 8 is a diagram for describing serial lot management.
Figure 8:
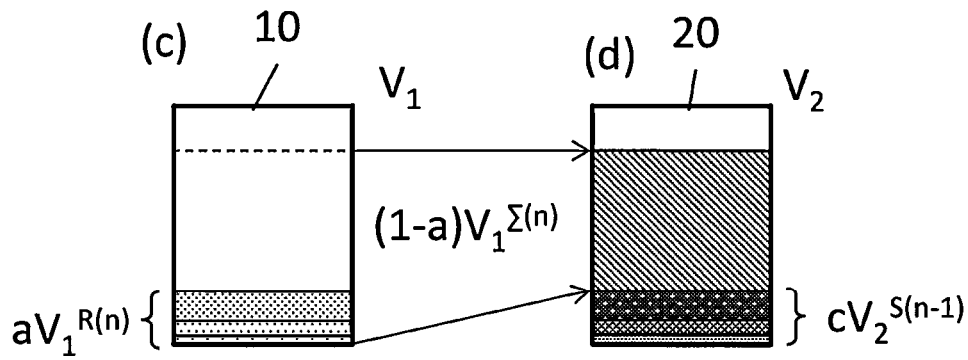
Figure 8:
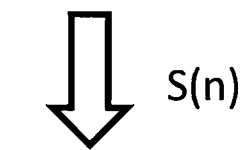

Next, the lot management of the electrolyte will be described with reference to FIG. 8. This is an example process of step S124 in FIG. 2. In FIG. 8, (a) and (c) show the receiving storage tank 10, and (b) and (d) show the supply storage tank 20. In addition, (a) and (b) illustrate respective cases at the same timing, and (c) and (d) also illustrate respective cases at the same timing but separate from that of (a) and (b).

First, referring to FIG. 8(a) and FIG. 8(b), V1 is the volume of the receiving storage tank 10 and V2 is the volume of the supply storage tank 20. Furthermore, it is assumed that at least "a (a is a real number smaller than 1)" times the volume of the receiving storage tank 10 remains in the receiving storage tank even after the electrolyte has been transferred to the supply 10 storage tank 20, and that at least "c (c is a real number smaller than 1)" times the supply storage tank 20 remains in the supply storage tank 20 even after the electrolyte has been transferred to the use point 92.

Then, when the electrolyte of the n-th lot is received in the receiving storage tank 10, the electrolytes of the lot numbers up to n−1 remain therein. The remaining electrolytes of the lot numbers up to n−1 are denoted by R (n−1), and the remaining amount of the electrolytes of the lot numbers up to n−1 is denoted by "$aV_1^{R(n-1)}$". The superscripts do not represent a multiplier, but rather a lot number. The same applies hereinafter. Therefore, the input amount of the electrolyte of the n-th lot is expressed as "$(1-a)V_1^n$". This means that the electrolyte of the n-th lot is present in a volume of "$(1-a)V_1$".

In FIG. 8(a), the volume of the electrolyte in the receiving storage tank 10 is denoted by "$V_1^{\Sigma(n)}$". The total amount of electrolyte in the receiving storage tank 10 is expressed by the sum of the electrolyte of the n-th lot and the remaining electrolytes of the lot numbers up to n−1. This matter can be expressed by the mathematical formula (1).

[Mathematical Formula 1]

$$V_1^{\Sigma(n)}=(1-a)V_1^n+aV_1^{R(n-1)} \quad (1)$$

In FIG. 8(b), there are the remaining electrolytes of the lot numbers up to n−1. When these electrolytes are denoted by S(n−1), the amount thereof is expressed as "$cV_2^{S(n-1)}$". This indicates that there are the remaining electrolytes of the lot numbers up to n−1 in an amount that is c times the volume V2.

In FIG. 8(a), when the temperature adjustment is completed in the receiving storage tank 10, as shown in FIG. 8(c), the electrolyte in an amount of (1−a) V1 is transferred to the supply storage tank 20. Therefore, the amount of the electrolyte to be transferred is expressed as "$(1-a)V_1^{\Sigma(n)}$". This amount is the transferred liquid of the n-th lot.

As shown in FIG. 8(d), the electrolyte in the supply storage tank 20 is the sum of the electrolyte of the n-th lot that has been transferred and the remaining electrolytes of the lot numbers up to n−1. This means that the electrolyte is composed mainly of the electrolyte of the n-th lot. When this matter is denoted by L (n), the mathematical formula (2) is obtained.

[Mathematical Formula 2]

$$L(n)=(1-a)V_1^{\Sigma(n)}+c\,V_2^{S(n-1)} \quad (2)$$

If UL (n) is the consumed amount, then UL(n)=(1−c)L(n) is defined. The remaining amount of the electrolyte after the electrolyte of the n-th lot has been used is "$cV_2^{S(n)}$". These matters are expressed by the mathematical formulas (3) and (4), respectively.

[Mathematical Formula 3]

$$UL(n)=(1-c)L(n)=(1-c)\{(1-a)V_1^{\Sigma(n)}+c\,V_2^{S(n-1)}\} \quad (3)$$

[Mathematical Formula 4]

$$cV_2^{S(n)}=c\{(1-a)V_1^{\Sigma(n)}+cV_2^{S(n-1)}\} \quad (4)$$

As described above, the electrolyte of the n-th lot can be managed on the basis of the sum of first, the sum of the amounts of the electrolytes in the receiving storage tank 10, calculated by adding the remaining amount of the electrolytes of the lot numbers up to n−1 and the amount of the electrolyte of the new n-th lot therein, and second, the remaining amount of the electrolytes of the lot numbers up to n−1 in the supply storage tank 20, as expressed by the mathematical formula (2). If n is large, the calculation will be enormous. In practice, however, the remaining amounts of the electrolytes of the lot before the third generation will be very small, and so such amounts can be ignored and the calculation will not be very complicated. Therefore, since the delivered electrolyte is consumed in order, even when the calculation is enormous, the management is easy.

As described above, the date and time when the electrolyte of the n-th lot number is input into the receiving storage tank 10, the date and time when the electrolyte is transferred to the supply storage tank 20, and the time period during which the electrolyte was supplied from the supply storage tank 20 to the use point 92 are accurately recorded. Consequently, it is possible to know how much electrolyte of which lot was contained in the electrolyte supplied from the supply storage tank 20 and how much of this electrolyte was used. Therefore, it is also possible to know how much the electrolyte of which lot was used in a product whose production date is known, and it is possible to perform the lot management of electrolytes.

Figure 9:
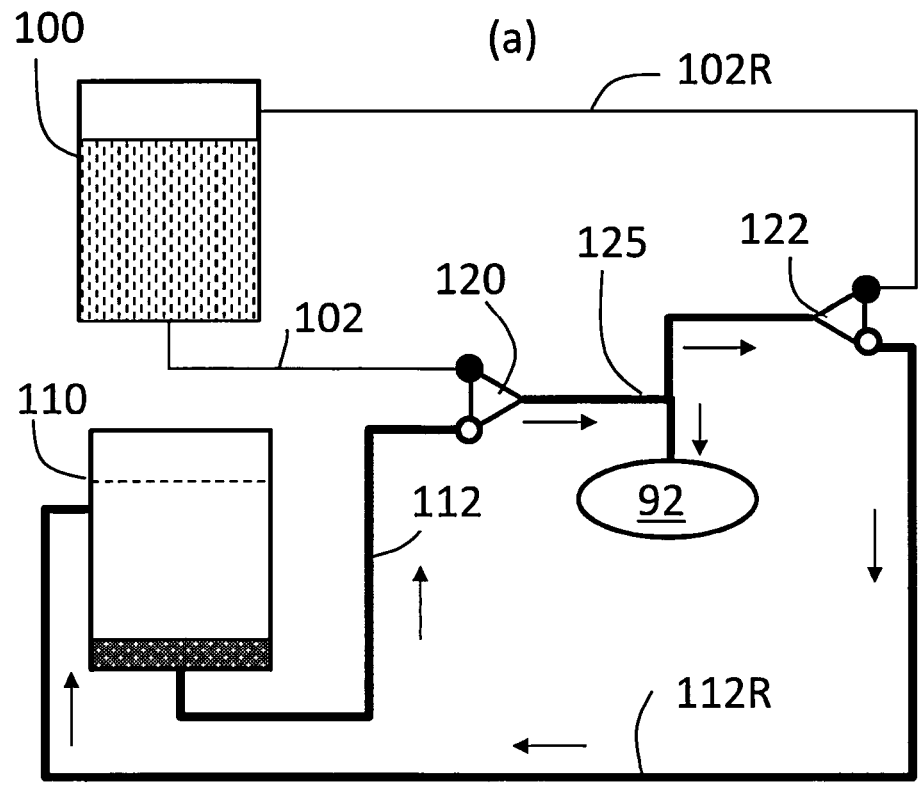
FIG. 9 is a diagram illustrating the flow of the electrolyte when the supply storage tanks are arranged in parallel.
Figure 9:
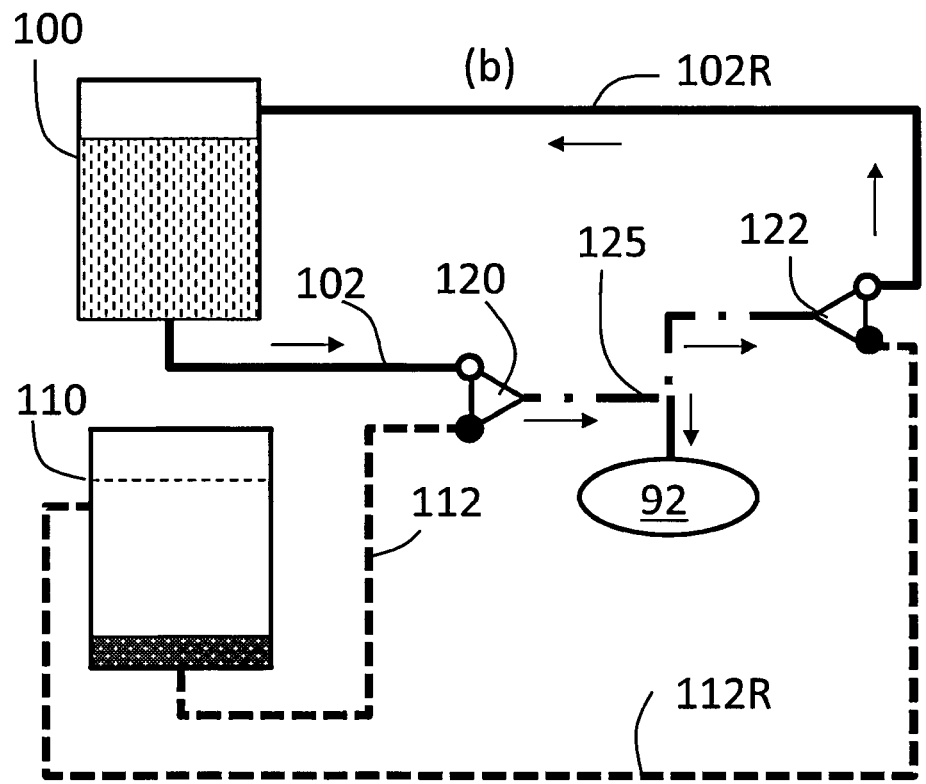

FIG. 9 is a schematic view illustrating cases where the supply storage tanks 20 of FIG. 1 are arranged in parallel. Referring to FIG. 9(a), a supply storage tank 100 and a supply storage tank 110 are arranged in parallel and connected to a switching valve 120 through supply pipes (102 and 112, respectively). An electrolyte is supplied to a use point 92 through a pipe 125 that is connected to the switching valve 120.

A switching valve 122 is disposed at the end of the use point 92, and return pipes (102R and 112R, respectively) to the respective supply storage tanks 100 and 110 are provided. Note that a pump is omitted in the figure, and the switching valves 120 and 122 each include a white circle representing the open side and a black circle representing the closed side.

Referring to FIG. 9(a), the electrolyte is now supplied from the supply storage tank 110. The electrolyte returns to the supply storage tank 110 through the route of the supply pipe 112, the switching valve 120, the pipe 125, the switching valve 122, and the return pipe 112R.

FIG. 9(b) shows a case where the switching valves 120 and 122 are operated to switch to the supply storage tank 100. At this time, the electrolyte from the supply storage tank 110 remains in the pipe 125 (a portion indicated by a chain line). The electrolyte returns to the supply storage tank 100 through the return pipe 102R.

That is, the electrolyte from the supply storage tank 110 of a different system returns to the supply storage tank 100. The same occurs in the supply storage tank 110 where the electrolyte from the supply storage tank 100 of a different system is allowed to return to the supply storage tank 110. When the electrolyte returns to a supply storage tank of a different system, it is not easy to clarify the lot management as in the above-described mathematical formulas (2), (3), and (4). Specifically, the electrolyte that was delivered as that of the previous lot remains as a residual component.

Furthermore, referring to FIG. 9(b), in the return pipe 112R (a part indicated by a broken line), which returns to the supply storage tank 110, the electrolyte of the previous lot is left, and the temperature control is not performed thereon until the next supply from the supply storage tank 110 is performed. If the state outside the temperature range continues for a longer period of time, the quality of the electrolyte will also be compromised, and an electrolyte having poor quality will be supplied to the use point 92.

On the other hand, by arranging the receiving storage tank 10 and the supply storage tank 20 in series as in the present invention, it is possible to prevent the electrolyte from staying in the return pipe 32R or in the pipe from the receiving storage tank 10 to the supply storage tank 20. In addition, since the electrolytes of different systems are not mixed and the electrolyte is consumed in the order in which the electrolyte is delivered, the lot management becomes easy.

As described above, the electrolyte supply system 1 according to the present invention has a configuration in which the receiving storage tank 10 and the supply storage tank 20 are arranged in series. Thus, it is possible to adjust the temperature of a large amount of an electrolyte while constantly supplying the electrolyte to the use point 92. Therefore, even when an electrolyte has a narrow storage temperature range, the electrolyte can be controlled to be at a predetermined temperature and can be supplied at any time, 24 hours a day. In addition, lot management is possible, and the material history can be traced when a defective product occurs.

Secondary batteries can be manufactured by a known method using the electrolyte supplied by the electrolyte supply system 1 according to the present invention. As an example, a positive electrode and a negative electrode are prepared by bonding a positive electrode material and a negative electrode material to respective base materials and increasing the densities thereof by a press or the like. A separator is sandwiched between these electrodes to form an assembly, and a plurality of the resulting assemblies is stacked. The resulting laminate is placed in a can, which serves as a container of a battery. Then, the electrolyte supplied by the electrolyte supply system 1 according to the present invention is injected thereinto, and a lid is welded thereon. The lid and the container serve as respective electrodes of the battery.

INDUSTRIAL APPLICABILITY

The electrolyte supply system according to the present invention can be suitably used when a large amount of an electrolyte for a lithium ion-based battery is stored and supplied.

REFERENCE SIGNS LIST 1 electrolyte supply system
10 receiving storage tank
12 receiving storage tank pump
14 pressure monitoring unit
15 temperature control device
16 breather valve
18 circulation pipe
18v circulation pipe valve
20 supply storage tank
22 supply storage tank pump
24 pressure monitoring unit
25 temperature control device
26 breather valve
28 circulation pipe
30 supply pump
32 supply pipe
32R return pipe
32RT thermometer
38 connection pipe
38v connection pipe valve
40 gas-liquid separation device
40v valve
42 receiving pump
44 receiving pipe
50 controller
80 lorry
82 valve
90 indoor space
92 use point
100, 110 supply storage tank
102, 112 supply pipe
120, 122 switching valve
102R, 112R return pipe
125 pipe

The invention claimed is:

1. An electrolyte supply system for supplying an electrolyte to a use point, comprising:
   a receiving storage tank configured to store the electrolyte that has been delivered,
   a circulation pipe for recirculating the electrolyte in the receiving storage tank to the receiving storage tank;
   a receiving storage tank pump provided in the circulation pipe to circulate the electrolyte;
   a supply storage tank to which the electrolyte is transferred from the receiving storage tank;
   a connection pipe provided in the circulation pipe to connect the receiving storage tank and the supply storage tank;
   a temperature control device configured to control temperatures of the electrolyte in the receiving storage tank and that in the supply storage tank; and
   a supply pipe that is laid from the supply storage tank to the use point;
   wherein
   the supply pipe is of a circulation type with which the electrolyte returns to the supply storage tank.

2. The electrolyte supply system according to claim 1, further comprising a controller configured to send an instruction so that the electrolyte is transferred from the receiving storage tank to the supply storage tank when an amount of the electrolyte in the supply storage tank becomes a predetermined amount or less.

3. The electrolyte supply system according to claim 1, comprising a controller configured to calculate a lot percentage after transfer of the electrolyte from the receiving storage tank to the supply storage tank has been completed.

4. The electrolyte supply system according to claim 1, wherein the temperature control device is disposed at each of the receiving storage tank and the supply storage tank.

5. A manufacturing method of a secondary/rechargeable battery containing an electrolyte comprising:
   a process for placing a positive electrode, a negative electrode, and a separator in a container; and
   a process for supplying the electrolyte by the electrolyte supply system according to claim 1.

* * * * *